(12) United States Patent
Mallory et al.

(10) Patent No.: US 6,723,431 B2
(45) Date of Patent: *Apr. 20, 2004

(54) MULTILAYER METALLIZED POLYOLEFIN FILM

(75) Inventors: William Mallory, Rochester, NY (US); Robert Migliorini, Victor, NY (US); Larry Parr, Canandaigua, NY (US)

(73) Assignee: ExxonMobil Oil Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/490,477

(22) Filed: Jan. 24, 2000

(65) Prior Publication Data

US 2002/0031651 A1 Mar. 14, 2002

(51) Int. Cl.[7] .......................... B32B 15/08; B32B 27/08; B32B 27/32
(52) U.S. Cl. ................. 428/418; 428/424.2; 428/424.6; 428/458; 428/461; 428/500; 428/515; 428/516; 428/518
(58) Field of Search ................. 428/500, 515, 428/516, 517, 461, 213, 424.6, 458, 518, 418, 424.2

(56) References Cited

U.S. PATENT DOCUMENTS

| | | | |
|---|---|---|---|
| 3,753,769 A | 8/1973 | Steiner | 428/331 |
| 3,916,048 A * | 10/1975 | Walles | 428/35 |
| 4,214,039 A | 7/1980 | Steiner et al. | 428/414 |
| 4,309,466 A * | 1/1982 | Stillman | 428/35 |
| 4,345,005 A | 8/1982 | All et al. | 428/461 |
| 4,389,438 A * | 6/1983 | Ohtsuki et al. | 428/35 |
| 4,439,493 A | 3/1984 | Hein et al. | 428/414 |
| 4,447,494 A | 5/1984 | Wagner, Jr. et al. | 428/349 |
| 4,457,977 A | 7/1984 | Walles | 428/463 |
| 4,681,803 A | 7/1987 | Liu | 428/348 |
| 4,692,380 A | 9/1987 | Reid | 428/349 |
| 4,719,147 A * | 1/1988 | Mauri | 428/336 |
| 4,855,187 A * | 8/1989 | Osgood, Jr. et al. | 428/516 |
| 4,865,908 A * | 9/1989 | Liu et al. | 428/248 |
| 5,017,429 A * | 5/1991 | Akao | 428/349 |
| 5,153,074 A | 10/1992 | Migliorini | 428/463 |
| 5,182,168 A | 1/1993 | Chu et al. | 428/330 |
| 5,194,318 A | 3/1993 | Migliorini et al. | 428/215 |
| 5,487,940 A * | 1/1996 | Bianchini et al. | 428/349 |
| 5,496,649 A | 3/1996 | Mallory et al. | 428/518 |
| 5,500,283 A * | 3/1996 | Kirk et al. | 428/349 |
| 5,525,421 A | 6/1996 | Knoerzer | 428/347 |
| 5,527,608 A * | 6/1996 | Kemp-Patchett et al. | 428/349 |
| 5,547,764 A | 8/1996 | Blais et al. | 428/461 |
| 5,591,520 A | 1/1997 | Migliorini et al. | 428/347 |
| 5,725,962 A | 3/1998 | Bader et al. | 428/515 |
| 5,837,354 A | 11/1998 | Ogisu et al. | 428/208 |
| 5,885,703 A * | 3/1999 | Wilkie | 428/220 |
| 5,885,721 A | 3/1999 | Su et al. | 428/516 |
| 5,972,496 A | 10/1999 | Bader et al. | 428/331 |
| 6,071,621 A * | 6/2000 | Falaas et al. | 428/425.8 |
| 6,503,635 B1 * | 1/2003 | Kong et al. | 428/461 |

FOREIGN PATENT DOCUMENTS

| | | | |
|---|---|---|---|
| DE | 43 44 438 | * | 11/1995 |
| EP | 0 680 823 A | * | 11/1995 |
| EP | 0 698 634 A | * | 2/1996 |
| GB | 2 210 899 A | * | 6/1999 |

* cited by examiner

Primary Examiner—Monique R. Jackson
(74) Attorney, Agent, or Firm—Rick F. James (57) ABSTRACT

Multilayer metallized polyolefin film structures having improved barrier properties and reduced water vapor transmission and oxygen transmission properties are provided. The film structures include a polyolefin substrate having a first and second side, a metal layer adjacent to the first side of the substrate and substantially coextensive therewith and a coating layer adjacent to the metal layer and substantially coextensive therewith. The coating layer includes a coating selected from the group consisting of polyvinylidene chloride, polyvinyl alcohol and acrylic coating.

12 Claims, 2 Drawing Sheets

MULTILAYER METALLIZED POLYOLEFIN FILM

BACKGROUND OF THE INVENTION

The present invention relates to polymer films. Specifically, the present invention relates to multilayer metallized polyolefin film structures having improved barrier properties and reduced water vapor transmission and oxygen transmission properties.

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching and windup. For a general description of these and other processes associated with film-making, see K R Osborn and W A Jenkins, *Plastic Films. Technology and Packaging Applications*, Technomic Publishing Co., Inc., Lancaster, Pa. (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature (Tg) but below its crystalline melting point (Tm), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength.

Biaxial orientation is employed to more evenly distribute the strength qualities of the film in two directions. Biaxially oriented films tend to be stiffer and stronger, and also exhibit much better resistance to flexing or folding forces, leading to their greater utility in packaging applications.

It is technically quite difficult to biaxially orient films by simultaneously stretching the film in two directions. Apparatus for this purpose is known, but tends to be expensive to employ. As a result, most biaxial orientation processes involve apparatus which stretches the film sequentially, first in one direction and then in the other. Again for practical reasons, typical orienting apparatus stretches the film first in the direction of the film travel, i.e., in the longitudinal or "machine direction" (MD), and then in the direction perpendicular to the machine direction, i.e., the lateral or "transverse direction" (TD).

The degree to which a film can be oriented is dependent upon the polymer from which it is made. Polypropylene, polyethylene terephthalate (PET), and nylon are highly crystalline polymers that are readily heat stabilized to form dimensionally stable films. These films are well known to be capable of being biaxially stretched to many times the dimensions in which they are originally cast (e.g., 5× by 8× or more for polypropylene).

The film-making process can also include vacuum metallization to obtain a metal-like appearance and to enhance the barrier characteristics of a film. Further, the film-making process can include coating a film to impart superior characteristics to the film and methods of coating are well known in the art. Most known methods provide for coating a film after it has been biaxially oriented. However, most known methods do not provide for coating a metallized film.

Attempts have been made in the past to provide metallized films having enhanced barrier properties. For example, U.S. Pat. No. 5,525,421 issued to Knoerzer discloses a metallized film including an oriented polypropylene substrate layer having at least one surface of a coating of a vinyl alcohol homopolymer on which there is a metal layer. Also, U.S. Pat. No. 4,692,380 issued to Reid discloses a metallized film including a homopolypropylene core layer having on one of its surfaces a corona-treated propylene-ethylene copolymer layer and a metal coating applied on the corona-treated layer.

Accordingly, it is one of the purposes of this invention, among others, to provide multilayer metallized polyolefin films having improved barrier properties and reduced water vapor transmission and oxygen transmission properties, without requirement for chemical additives such as cross-linking agents, and without requirement for supplemental processing steps such as irradiation of the film or lamination.

SUMMARY OF THE INVENTION

The present invention is directed to film structures in which a biaxially oriented polyolefin substrate is metallized and then coated. The present invention provides for a multilayer film structure having improved barrier properties and reduced water vapor transmission and oxygen transmission properties. The multilayer film structure includes a polyolefin substrate having a first and second side, a metal layer adjacent to the first side of the substrate and substantially coextensive therewith and a coating layer adjacent to the metal layer and substantially coextensive therewith. The coating layer includes a coating selected from the group consisting of polyvinylidene chloride (PVdC), polyvinyl alcohol (PVOH) and acrylic coating.

Preferably, the coating is a highly crystalline PVdC. Further, the coating layer is preferably from about 3.0 wt % to about 22.0 wt % of the film structure.

The metal layer includes a metal selected from the group including aluminum, gold, silver, chromium, tin and copper. In addition, the metal layer is preferably less than about 0.1 wt % of the film structure.

The substrate is preferably from about 77.0 wt % to about 96.0 wt % of the film structure.

In a preferred embodiment, the multilayer film structure of the present invention further includes a primer layer between the metal layer and the coating layer. Preferably, the primer layer includes a primer selected from the group including polyethylene imine, urethane and epoxy. Further, the primer layer is preferably from about 0.01 wt % to about 1.0 wt % of the film structure.

In another preferred embodiment, the multilayer film structure of the present invention further includes a skin layer between the substrate and the metal layer. The skin layer includes a polyolefin selected from the group including polypropylene homopolymer, ethylene propylene random copolymer, ethyl vinyl alcohol copolymer, high density polyethylene (HDPE), medium density polyethylene (MDPE), linear low density polyethylene (LLDPE), low density polyethylene (LDPE), ethylene propylene butylene terpolymer and propylene butylene copolymer.

In another preferred embodiment, the multilayer film structure of the present invention further includes a skin layer adjacent to the second side of the substrate. The skin layer includes a polyolefin selected from the group including ethylene propylene copolymer, ethylene propylene butylene terpolymer, propylene butylene copolymer, ethylene propylene impact copolymer, ethylene methyl acrylate copolymer, ethylene vinyl acetate copolymer, HDPE, MDPE, LDPE and LLDPE. Optionally, the skin layer is coated with a coating selected from the group including PVDC, acrylic coating, ethylene acrylic acid copolymer and PVOH.

The films of the present invention can be widely used in food packaging applications due to their superior barrier properties as films utilized in food packaging must be as resistant as possible to the transmission of moisture, air and deleterious flavors.

The multilayer metallized polyolefin film structures of the present invention have improved flavor and aroma barrier properties and reduced water vapor transmission and oxygen transmission properties. These properties result from the combination of a metal layer and a coating layer in the film structures of the present invention. The barrier properties of the film structure of the present invention are also preserved since the coating layer protects the metal layer from scratching and mechanical degradation. These properties make these films an excellent alternative to laminated films currently used in food packaging.

These and other advantages of the present invention will be appreciated from the detailed description and example which are set forth herein. The detailed description and example enhance the understanding of the invention, but are not intended to limit the scope of the invention.

BRIEF DESCRIPTION OF THE DRAWINGS

Preferred embodiments of the present invention have been chosen for purposes of illustration and description, but are not intended in any way to restrict the scope of the invention. The preferred embodiments of certain aspects of the invention are shown in the accompanying drawings, wherein.

DETAILED DESCRIPTION OF THE INVENTION

The present invention provides for multilayer film structures having improved barrier properties and reduced water vapor transmission and oxygen transmission rate properties. Multilayer film structures of the present invention include a polyolefin substrate having a first and second side, a metal layer adjacent to the first side of the substrate and substantially coextensive therewith and a coating layer adjacent to the metal layer and substantially coextensive therewith. The coating layer includes a coating selected from the group including PVdC, PVOH and acrylic coating.

The polyolefin substrate of the multilayer film structures of the present invention preferably includes a homopolymer polypropylene or an ethylene propylene copolymer containing predominantly propylene. In a preferred embodiment, the polyolefin substrate includes a layer of homopolymer propylene and a layer of the copolymer. For further discussion concerning polypropylene substrates that can be used in the film structures of the present invention, see U.S. Pat. Nos. 5,153,074; 5,194,318; and 5,591,520, all of which are incorporated herein by reference.

The propylene homopolymers contemplated by the present invention are from 80–100% isotactic and preferably from 95–96% isotatic polypropylene. They have a melt index ranging from about 2 to about 10 grams/10 minutes and preferably a melt index of from about 3.5–6 grams/10 minutes. Preferred propylene copolymers include 98-96/2-4 propylene/ethylene copolymers.

One embodiment of the present invention relates to a method of producing an oriented propylene homopolymer or copolymer base film for metallization which exhibits superior metal adhesion in comparison to other oriented base films. This is achieved by co-extruding a high density polyethylene skin layer onto the selected propylene homopolmyer or copolymer base and subsequently orienting the structure in the machine and transverse directions. Thereafter, the high density polyethylene surface is treated either by corona discharge treatment or by flame treatment. The corona discharge treatment can be to about 35–60 dynes/cm. and preferably to about 35–40 dynes/cm. Thereafter, the base film produced can be metallized by any known methods for example electroplating, sputtering and vacuum metallizing. A preferred method of metallizing the treated outer layer is by vacuum deposition. The metal coating can be any of the typical metals such as aluminum, copper, silver and chromium.

One embodiment of the present invention is a metallized film combination that includes a polymer substrate, which is susceptible in unmodified form of transmitting oxygen and water vapor, at least a first surface of the substrate includes a maleic acid anhydride modified propylene homopolymer or copolymer, the first surface having a skin layer thereon of ethylene vinyl alcohol copolymer and the skin layer having aluminum deposited directly thereon.

In a preferred form of the above-defined structure, the substrate includes a propylene homopolymer or copolymer. The first surface includes a member selected from the group consisting of: (a) maleic acid anhydride modified propylene homopolymer or copolymer intermixed with said propylene homopolymer or copolymer substrate; and (b) a separately applied skin layer which includes maleic acid anhydride modified propylene homopolymer or copolymer on the first surface of the substrate.

The preferred surface is maleic acid anhydride modified propylene homopolymer or copolymer intermixed with the polymer substrate. Alternatively, at least one surface includes a maleic acid anhydride modified propylene homopolymer or copolymer applied as a separate skin layer to the substrate.

By a "maleic anhydride modified polypropylene homopolymer or copolymer" is meant the product resulting from the reaction between maleic anhydride and the thermal degradation product of polypropylene or polypropylene copolymer. Examples of this material can be found disclosed in U.S. Pat. No. 3,480,580, issued Nov. 25, 1969, the disclosure of which is incorporated herein by reference in its entirety.

The maleic anhydride modified polypropylene or a copolymer thereof can be prepared by a fairly simple process. For example, about 125 grams of low viscosity polypropylene of 3,300 centipoise at 190° C. and 7.5 grams of maleic anhydride are placed in a 500 ml. glass, round-bottom flask. This flask has 3 necks and is fitted with a metal sweep stirrer, a dropping funnel, and a steam-jacketed condenser to return maleic anhydride which boils out of the reaction mixture. The flask is lowered into a Wood's metal bath at a temperature of about 200° C. After about 1 hour the product is poured from the flask onto a metal tray. The waxy product will have a melt viscosity of 3,600 centipoise at 190° C. and a saponification number of 16.

The procedure for the use of a maleic anhydride modified polypropylene homopolymer or copolymer, when this material is interblended into the base layer is exemplified by the following technique. A maleic anhydride modified polypropylene e.g., Epolene E-43, a maleic anhydride modified polypropylene obtained from Eastman Kodak Company, melt-blended with a polypropylene homopolymer such as Exxon 4252 (85 parts) to give a 15% master batch. Twenty parts of the master batch is dry-blended with 80 parts of the polypropylene homopolymer to give a resin blend containing 3% of the maleic anhydride modified polypropylene. This blend will contain sufficient maleic anhydride-modified polypropylene at the surface of the substrate to aggressively bond poly(vinyl alcohol) thereto. An alternative method of making available the maleic anhydride-modified polypropylene homopolymer or copolymer at the surface of the substrate is to coextrude the base polymer with a skin layer containing the maleic anhydride-modified polymer.

The improved metallized film is achieved by adhering a thin layer of ethylene vinyl alcohol (EVOH) copolymer onto the surface of a substrate, such as an oriented polypropylene film, which has been modified by a maleic acid anhydride polypropylene homopolymer or copolymer. The layer can range in thickness from 3–30 gage units. The EVOH layer can be attached to the polypropylene core by any one of three processes: 1) coextrusion of an EVOH skin and the modified polypropylene core with the use of a mixing block or multicavity die, 2) extrusion coating of the EVOH layer onto the surface of the modified polypropylene between the machine direction orientation treatment of the film and the transverse direction orientation, 3) co-lamination of a thin EVOH film onto the surface of the modified polypropylene sheet between the machine direction orientation step and the transverse direction orientation step. For coextrusion, a suitable adhesive for bonding EVOH to polypropylene must be either incorporated into the polypropylene core or used as a tie layer between the EVOH and the polypropylene layers. The above-described resins with maleic anhydride graphed onto polypropylene are particularly suitable. For extrusion coating and colamination, it is necessary to corona treat the polypropylene surface for bonding just prior to contact with the EVOH melt or film. The EVOH/polypropylene structure subsequently gets oriented in the transverse direction in a tenter frame. The EVOH copolymer can have an ethylene contact ranging from 30–50%. A heat sealable film can be produced by coextruding an ethylene propylene (EP) copolymer or an ethylene propylene butene-1 (EPB) copolymer on the side of the substrate opposite to the EVOH.

The EVOH skin comprises the surface for aluminum deposition by typical vacuum metallization processes. An aluminum coating thickness yielding an optical density of about 1.5–3.0 is desired. A further advantage of this surface is that is not necessary to treat the EVOH skin surface prior to vacuum metallization because it inherently has a wetting tension of 39 dynes/cm. The polar nature of the EVOFI skin layer results in excellent aluminum adhesion to the substrate without the use of a surface treatment. The metallized OPP film also exhibits excellent bond strength and metal fracture resistance in both adhesive and extrusion lamination applications. Part of the unobvious aspect of the present invention is the unexpected improvement in moisture barrier characteristics that is achieved by metalizing directly onto the EVOFI surface. EVOH is inherently a poor moisture barrier material. In most polypropylene/EVOH coextrusion structures, the EVOH is buried to protect it from atmospheric moisture and hence preserve its excellent oxygen barrier properties. By metalizing on top of the EVOFI surface, a synergistic effect on moisture barrier characteristics is achieved that would not be predicted on the moisture barrier properties of the components. It is hypothesized that this effect is due to the formation of a different aluminum morphology than that achieved for typical metallized OPP. The metallized EVOH/OPP film formed as disclosed herein yields a very glossy metal appearance and good metal layer uniformity.

In another embodiment of the present invention, an oriented multi-layer film combination includes: (a) a base layer of polypropylene homopolymer or copolymer, at least a first surface thereof including a maleic acid anhydride modified polypropylene homopolymer or copolymer; and (b) on the first surface a skin layer of a member selected from the group consisting of (1) an amorphous polyamide and (2) a blend of an amorphous polyamide and a crystalline polyamide. This film combination presents a polyamide surface to which a metallized layer can be strongly bonded.

While the polyamide of the present invention can be applied directly to the surface of the polypropylene or the polypropylene copolymer, it is preferred that the surface be modified by a particular functionalized material. This can be mixed into or applied on top of the polypropylene substrate, then the polyamide will aggressively adhere to this so-modified material. If a maleic anhydride modified polypropylene homopolymer or copolymer becomes a part of the substrate surface either by being interblended therewith or by being extruded thereon as a surface skin layer, this then becomes an ideal surface for receiving the polyamide layer of the present invention.

The contemplated polyamides broadly include the amorphous polyamides and the semicrystalline polyamides. The amorphous polyamides are described as those polyamides which are lacking in crystallinity as shown by the lack of endotherm crystalline melting peak in a Differential Scanning Calorimeter measurement (ASTM D 3417), 10° C./minute. Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidene, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4- diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

Specific examples of amorphous polyamides which are suitable for this invention include: hexamethylenediamine isophthalamide, hexamethylenediamine isophthalamide/terephthalamide terpolymer, having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediamine with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

The above amorphous polyamides may contain as comonomers minor amounts of lactam species such as caprolactam or lauryllactam, even though polymers based on these monomers alone are not amorphous. The important feature is that the polyamide as a whole must be amorphous. Thus small amounts of these comonomers may be incorporated as long as they do not impart crystallinity to the polyamide. In addition, up to about 10 weight % of a liquid or solid plasticizer such as glycerol, sorbitol, or toluenesulfonamide ("Santicizer 8" from Monsanto) may be included with the amorphous polyamide.

For most applications, the Tg is likewise not clearly demarked. But amorphous polyamides with Tg above about 160° C. are not readily thermoformable when used as a barrier layer. Thus, all-aromatic polyamides, having aromatic groups in both acid and amine moieties, tend to have a Tg which is too high to permit thermoforming, and are thus normally unsuitable for the purposes of this invention.

As indicated above, the amorphous polyamide of the present invention can be blended with at least one semicrystalline polyamide. This term refers to the traditional semicrystalline nylons which are generally prepared from lactams or amino acids, such as nylon 6 or nylon 11, or from condensation of diamines such as hexamethylene diamine with dibasic acids, such as succinic, adipic, or sebacic acids. Copolymers and terpolymers of these polyamides are also included, such as copolymers of hexamethylenediamine/adipic acid with caprolactam (nylon 6,66). Blends of two or more crystalline polyamides can also be used. The polyamide of the present invention, both semicrystalline and amorphous, are prepared by condensation polymerization which is well known to those skilled in the art.

As indicated above, the polyamide skin comprises the surface for receipt of a vacuum metallization. A further advantage of employing such a polyamide is that it is not necessary to corona discharge treat the polyamide surface layer prior to metallization because it inherently has a wetting tension of 42 dynes/cm. Higher wetting tensions are, however, obtainable by employing corona or flame treatment processes. The inherent polar nature of the polyamide skin results in metal adhesion levels far exceeding those obtainable with a treated polypropylene homopolymer skin. The metallized OPP film also exhibits excellent bond strength in both adhesive and extrusion lamination. Further desirable properties of the polyamide/polypropylene base film for metallization, are that it displays an excellent oxygen gas barrier when metallized as well as optical clarity and metal uniformity. It also retains the other desirable properties of metallized oriented polypropylene film, such as, good water vapor barrier.

The polyolefin substrate of the multilayer film structures of the present invention can alternatively include a low density polyethylene ("LDPE"), a linear low density polyethylene ("LLDPE"), a medium density polyethylene ("MDPE") or a high density polyethylene ("HDPE").

The term "low density polyethylene" (LDPE) as used herein is defined to mean an ethylene-containing polymer having a density of about 0.926 or lower and a melt index (MI) of about 7. (Melt Index is expressed as g/10 min.) (Density (d) is expressed as $g/cm^3$.) LDPE is readily available, e.g., PE 1017 (MI=7; d=0.917) from Chevron, San Francisco, Calif., SLP 9045 (MI=7.5; d=0.908) from Exxon, Houston, Tex., and ZCE 200 (MI=3; d=0.918) from Mobil Chemical Corporation, Fairfax, Va.

The term "linear low density polyethylene" (LLDPE) as used herein is defined to mean a copolymer of ethylene and a minor amount of an olefin containing 4 to 10 carbon atoms, having a density of from about 0.910 to about 0.926 and a MI of from about 0.5 to about 10. LLDPE is readily available, e.g., Dowlex™ 2045.03 (MI=1.1; d=0.920) from Dow Chemical Company, Midland, Mich.

The term "medium density polyethylene" (MDPE) as used herein is defined to mean an ethylene-containing polymer having a density of from about 0.926 to about 0.940. MDPE is readily available, e.g., Dowlex™ 2027A from The Dow Chemical Company, and Nova 74B and Nova 14G from Nova Corporation, Sarnia, Ontario, Canada.

The term "high density polyethylene" (HDPE) as used herein is defined to mean an ethylene-containing polymer having a density of 0.940 or higher. One particularly suitable HDPE for use with the present invention is the resin sold as M6211 (d=0.958) by Equistar. Another particularly suitable HDPE is the resin sold as HD 7845.30 (d=0.958) by Exxon. Other suitable HDPE resins include, for example, BDM 94-25 (d=0.961) and 6573 XHC (d=0.959) which are both available from Fina Oil and Chemical Co., Dallas, Tex. and Sclair 19C (d=0.951) and 19F (d=0.961) which are both available from Nova Corporation, Sarnia, Ontario, Canada.

The melt index of the HDPE useful according to the invention is in the range of from about 0.2 to about 10.0. Preferably, the HDPE has a melt index in the range of from about 0.5 to about 2.0. Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The polyolefin substrate of the multilayer film structures of the present invention is biaxially oriented prior to metallization. Biaxial orientation is employed to evenly distribute the strength qualities of a film in the longitudinal or machine direction (MD) of the film and in the lateral or transverse direction (TD) of the film. Biaxially oriented films tend to be stiffer and stronger, and also exhibit much better resistance to flexing and folding forces, leading to greater utility in packaging applications.

As stated above, biaxial orientation can be conducted simultaneously in both directions, however, most biaxial orientation processes use apparatus which stretches the film sequentially, first in one direction and then in the other. A typical apparatus will stretch a film in the MD first and then in the TD. The degree to which a film can be stretched is dependent upon factors including, for example, the polymer from which a film is made. For further discussion concerning biaxial orientation, see U.S. Pat. No. 5,885,721 and U.S. application Ser. No. 08/715,546, still pending which are incorporated herein by reference for all that they disclose.

During the process of biaxial orientation, a cast material is typically heated (optionally including a pre-heating stage) to its orientation temperature and subjected to MD orientation between two sets of rolls, the second set rotating at a greater speed than the first by an amount effective to obtain the desired draw ratio. Then, the monoaxially oriented sheet is oriented in the TD by heating (again optionally including pre-heating) the sheet as it is fed through an oven and subjected to transverse stretching in a tenter frame. Alternative stretching methods are possible, including employing apparatus capable of simultaneous stretching, or stretching sequentially first in the TD and then in the MD. It is known that these methods often suffer from serious technical limitations rendering them impracticable or overly expensive.

A film structure according to the present invention is made primarily from either polypropylene or polyethylene and can be stretched to a relatively high degree. In particular, a film structure according to the present invention can be stretched in the machine direction to a degree of from about 6:1 to about 9:1 and in the transverse direction to a degree from about 6:1 to about 15:1. The higher the degree of stretch in both the MD and the TD, the better the gloss and haze is in the resulting film. The temperature at which a film is biaxially oriented ("stretch temperature") can also influence the haze, gloss and sealability properties of the resulting film.

The biaxial orientation of the substrate, including any preheating step as well as the stretching steps, can be performed using stretch temperatures in the range of from about the glass transition temperature (Tg) of the substrate to above the crystalline melting point (Tm) of the substrate. More specifically, orientation in the MD is conducted at from about 200° F. to about 320° F., more preferably from about 230° F. to about 295° F. Orientation in the TD is conducted at from about 230° F. to about 320° F., more preferably from about 255° F. to about 300° F. The skilled artisan will understand that the orientation temperature employed in a particular situation will generally depend upon the residence time of the base sheet and the size of the rolls. Apparatus temperature higher than the Tm of the polyolefin sheet can be appropriate if the residence time is short. The skilled artisan also understands that the temperatures involved in these processes are in relation to the measured or set temperatures of the equipment rather than the temperature of the polyolefin itself, which generally cannot be directly measured.

The film structures of the present invention also include a metal layer. Metallization, which occurs directly on the polyolefin substrate, is accomplished by conventional vacuum deposition. Aluminum is preferably the metal used although other metals such as gold, silver, chromium, tin and copper can also be used. In addition, the metal layer is preferably less than about 0.1 wt % of the film structure.

Further, it has been found advantageous to treat the polyolefin substrate of the film structure of the present invention prior to receiving the metallized layer. Such treatment enhances the adhesion of the metallized layer. A preferred treatment involves treating the surface to a surface tension level of at least about 35 dynes/cm and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred.

The multilayer polyolefin film structures of the present invention also include a coating layer including a coating selected from the group including PVdC, PVOH and acrylic coating. The amount of a coating provided in the coating layer of the multilayer film structure of the present invention should be from about 3.0 to about 22.0 wt % of the film structure.

The coating should be applied in such an amount that there will be deposited upon drying a smooth, evenly distributed layer, generally having a thickness of from about 0.015 mil to about 0.66 mil (1 mil=0.001 inch). The thickness of the applied coating should be such that it is sufficient to impart the desired oxygen, water vapor and flavor and aroma barrier characteristics to the resulting film structure. After applying the coating to a substrate, it is subsequently dried by hot air, radiant heat or by any other convenient means.

PVdC coatings used with the present invention can be of any known and conventional PVdC composition, for example, the compositions described in U.S. Pat. Nos. 4,214,039 and 4,447,494, both of which are herein incorporated by reference.

A commercially available PVdC coating having a vinylidene chloride content of at least 50% can be used with the present invention and preferably, a PVdC coating having a vinylidene chloride content of from about 75% to about 99% are used with the present invention. Further, the PVdC coating used with the present invention can also be a copolymer of vinylidene chloride and one or more other ethylenically unsaturated comonomers including alpha, beta ethylenically unsaturated acids such as acrylic and methacrylic acids, and alkyl esters containing 1–18 carbon atoms of said acids such as methyl methacrylate, ethyl methacrylate, butyl methacrylate, etc . . . . Also, PVdC coatings used with the present invention can be an alpha, beta ethylenically unsaturated nitrites such as acrylonitrile and methacrylonitrile, and monovinyl aromatic compounds such as styrene and vinyl chloride comonomers.

When used in accordance with the present invention, PVdC coatings preferably include about 82% by weight of vinylidene chloride, about 14% by weight of ethyl acrylate and about 4% by weight of acrylic acid. Alternatively, a polymer coating including about 80% by weight of vinylidene chloride, about 17% by weight of methyl acrylate and about 3% by weight of methacrylic acid can be used with the present invention.

PVOH coatings used with the present invention can be selected from the compositions disclosed in U.S. Pat. No. 5,547,764, which is incorporated herein by reference. The PVOH solution includes a blend of at least two PVOH resins having different degrees of hydrolysis. The first component of the PVOH blend has a high degree of hydrolysis of at least about 98%, i.e., about 98% of the acetate groups of the poly (vinyl acetate) have been replaced with alcohol (OH) groups. The second component has a low degree of hydrolysis of at least about 80% to 90%. The PVOH blend of the two components includes a ratio of about 1:2 to about 20:1, preferably from about 2:1 to about 5.1, and most preferably from about 2.5:1 to 3.5:1. It is preferable that the PVOH coatings be an aqueous solution which includes a blend of at least two PVOH resins in an appropriate ratio to water at a temperature sufficient to dissolve the PVOH resin, a crosslinking agent and optionally a catalyst.

Acrylic coatings that can be included in the coating layer of the film structures of the present invention can be selected from any of the terpolymeric compositions disclosed in U.S. Pat. Nos. 3,753,769 and 4,865,908, the contents of which are incorporated herein by reference. These coating compositions contain as a film forming component a resin consisting essentially of an interpolymer of: (a) from about 2 to about 15 parts by weight, preferably from about 2.5 to about 6 parts by weight, of an alpha, beta monoethylenically unsaturated carboxylic acid selected from the group consisting of acrylic acid, methacrylic acid and mixtures thereof; and (b) from about 85 to about 98 parts by weight, preferably from about 94 to about 97.5 parts by weight, of neutral monomer esters which preferably include methyl acrylate or ethyl acrylate, and methyl methacrylate. These interpolymer compositions are further characterized by preferably including from about 30% to about 55% by weight of methyl methacrylate when the alkyl acrylate is methyl acrylate and from about 52.5% to about 69% by weight of methyl methacrylate when the alkyl acrylate is ethyl acrylate. Such coating compositions can be applied to the films of this invention in a variety of ways including in the form of ammoniac solutions.

Before applying a coating to a metallized polyolefin substrate, the upper surface of the metal layer can be treated to increase its surface energy and therefore insure that the coating layer will be strongly adherent to the metal layer and thereby reducing the possibility of the coating peeling or being stripped away from the film. This treatment can be accomplished employing any of several known and conventional techniques.

Further, in applications where even greater adherence between the coating layer and metal layer is desired, i.e., greater than that resulting from treatment of the metal layer, an intermediate primer layer can be employed to increase the adherence of the coating layer to the metal layer. In this case, the metal layer is advantageously first treated to provide increased active adhesive sites thereon (thereby promoting primer adhesion) and subsequently a coating of a primer material is applied to the treated metal layer. Such primer materials are well known in the art and include, for example, epoxy, urethane and polyethylene imine (PEI) materials. U.S. Pat. Nos. 3,753,769 and 4,439,493, which are herein incorporated by reference, disclose the use and application of such primers. Further, U.S. Pat. Nos. 4,447,494 and 4,681,803 both of which are incorporated herein by reference, disclose compositions of epoxy polymers and polyurethanes that can be used as a primer in the present film structures. The primers provide an overall adhesively active surface for thorough and secure bonding with the subsequently applied coating and primers can be applied to the metal layer by conventional solution coating means, for example, by mating roller application.

The coating can be applied to a metal layer as a solution, e.g., one prepared with an organic solvent such as an alcohol, ketone, ester, etc. However, since the coating can contain insoluble, finely divided inorganic materials which are difficult to keep well dispersed in organic solvents, it is preferable that the coating be applied to the treated surface in any convenient and known manner, such as by gravure coating, roll coating, dipping, spraying, etc. The excess aqueous solution can be removed by squeeze rollers, doctor blades, etc.

In a preferred embodiment of the present invention, the multilayer film structure of the present invention further includes a skin layer interposed between the substrate and the metal layer. The skin layer includes a polyolefin selected from the group including polypropylene homopolymer, ethylene propylene random copolymer, ethyl vinyl alcohol copolymer, HDPE, MDPE, LLDPE, LDPE, ethylene propylene butylene terpolymer and propylene butylene copolymer.

In another preferred embodiment of the present invention, the multilayer film structure further includes a skin layer adjacent to the second side of the substrate. The skin layer includes a polyolefin selected from the group including ethylene propylene copolymer, ethylene propylene butylene terpolymer, propylene butylene copolymer, ethylene propylene impact copolymer, ethylene methyl acrylate copolymer, ethylene vinyl acetate copolymer, HDPE, MDPE, LDPE and LLDPE. Further, a coating selected from the group including PVDC, acrylic coating, ethylene acrylic acid copolymer and PVOH can be applied to this skin layer to enhance the sealability and/or barrier of the film structure.

The total thickness of the film structures of the present invention is not critical and will be selected to meet the particular service requirements. For example, when used in packaging, the total thickness of a multilayer polyolefin film structure can be from about 0.5 mil to about 3.0 mil wherein the substrate is about 77.0 to about 96.0 wt % of the film structure, the metal layer is less than about 0.1 wt % of the film structure and the coating layer is about 3.0 to about 22.0 wt % of the film structure.

While the foregoing embodiments have been illustrated, it should be noted that several other embodiments having multiple layers with varying compositions and thicknesses can be prepared according to the present invention having improved barrier properties and reduced water vapor transmission and oxygen transmission properties.

The film structures of the present invention can be surface treated with conventional methods to improve wettability of the film and ink receptivity.

The film structures of the present invention are useful in numerous applications including food packaging and in particular, in food packaging where aroma, flavor, water vapor and oxygen barrier is desirable. The film structures of the present invention also have improved barrier properties which makes them advantageous for use in cigarette pack inner liners, as overwrap for butter, chocolate, candy, etc.

The following example is provided to assist in further understanding the invention. The particular materials and conditions employed are intended to be further illustrative of the invention and are not limiting upon the reasonable scope thereof.

EXAMPLE 1

In this example, several uncoated metallized polypropylene films and several coated metallized polypropylene film structures according to the present invention were prepared and the oxygen and water vapor barrier properties of each film were then measured. The uncoated metallized polypropylene films were prepared by vacuum deposition of aluminum directly on a polypropylene substrate. The oxygen and water vapor barrier properties of these films are shown below in TABLE 1.

TABLE 1

| Film Sample | Primer in Film | Coating in Film | Thickness of Resulting Film | OTR | WVTR |
|---|---|---|---|---|---|
| 1 | None | None | 0.75–0.82 | 2.220 | — |
| 2 | None | None | 0.75–0.82 | 1.440 | — |
| 3 | None | None | 0.75–0.82 | 2.390 | — |
| 4 | None | None | 0.75–0.82 | 2.20 | — |
| 5 | None | None | 0.75–0.82 | 0.520 | 0.0106 |
| 6 | None | None | 0.75–0.82 | 1.060 | 0.0106 |
| 7 | None | None | 0.75–0.82 | 0.880 | 0.0118 |

Film Samples 1–7 are uncoated metallized polypropylene films. The water vapor transmission rates (WVTR) of Film Samples 1–7 are given in g/100 in$^2$/day and were measured at 100° F. and 90% Rh (ASTM F 1249-89). The oxygen transmission rates (OTR) of Film Samples 1–7 are given in cc/100 in$^2$/day and were measured at 73° F. and 0% Rh (ASTM D 3985-81).

The coated metallized polypropylene film structures according to the present invention were prepared by applying an aqueous based primer to a metallized polypropylene substrate by the reverse direct gravure process and then drying the primer in a forced air oven. Each of the primers had a dry weight in the range of 0.075 grams/1000 in$^2$ to 0.150 grams/1000 in$^2$. Subsequently, an aqueous based PVdC coating was applied on the primer layer and the coating was dried in a forced air oven to remove the solvent in the coating solution. Each of the PVdC coatings had a dry weight in the range of 1.00 grams/1000 in$^2$ to 4.0 grams/1000 in$^2$. The resulting film structures had excellent barrier characteristics as shown below in TABLE 2.

TABLE 2

| Film Sample | Primer in Film | Coating in Film | Thickness of Resulting Film | OTR | WVTR |
|---|---|---|---|---|---|
| 8 | Epoxy | PVdC (8500) | 0.80 | 0.080 | 0.000 |
| 9 | Epoxy | PVdC (8500) | 0.78 | 0.080 | 0.010 |
| 10 | Epoxy | PVdC (8500) | 0.73 | 0.066 | 0.006 |
| 11 | Epoxy | PVdC (8500) | 0.75 | 0.067 | 0.004 |
| 12 | PEI | PVdC (8300) | 0.75–0.82 | 0.310 | 0.008 |
| 13 | Epoxy | PVdC (8300) | 0.75 | 1.32 | 0.01 |
| 14 | Epoxy | PVdC (8300) | 0 74 | 1.32 | — |
| 15 | Epoxy | PVdC (8300) | 0.76 | — | 0.02 |
| 16 | Urethane | PVdC (8300) | 0.81 | 0.87 | — |
| 17 | Urethane | PVdC (8300) | 0.84 | 0.70 | — |
| 18 | Urethane | PVdC (8300) | 0.82 | — | 0.14 |
| 19 | Urethane | PVdC (8300) | 0.80 | — | 0.01 |
| 20 | LTSC | PVdC (8300) | 0.82 | 0.22 | 0.17 |
| 21 | LTSC | PVdC (8300) | 0.90 | 0.21 | 0.13 |
| 22 | Urethane | PVdC (8300) | 0.80 | 0.72 | 0.04 |
| 23 | Urethane | PVdC (8300) | 0.76 | 0.80 | 0.02 |
| 24 | Polyester | PVdC (8300) | 0.78 | 1.08 | 0.09 |
| 25 | Polyester | PVdC (8300) | 0.81 | 0.98 | 0.05 |
| 26 | Urethane | PVdC (8300) | 0.75–0.82 | 0.703 | 0.008 |
| 27 | Urethane | PVdC (8500) | 0.77 | 0.140 | 0.009 |
| 28 | Urethane | PVdC (8500) | 0.78 | 0.160 | 0.007 |
| 29 | Urethane | PVdC (8500) | 0.75–0.82 | 0.217 | 0.011 |
| 30 | Urethane | PVdC (8500) | 0.75–0.82 | 0.173 | 0.012 |
| 31 | Urethane | PVdC (8500) | 0.75–0.82 | 0.234 | 0.010 |
| 32 | Urethane | PVdC (8500) | 0.75–0.82 | 0.610 | 0.008 |
| 33 | Urethane | PVdC (8500) | 0.75–0.82 | 0.260 | 0.009 |
| 34 | Urethane | PVdC (8500) | 0.75–0.82 | 0.239 | 0.006 |
| 35 | Urethane | PVdC (8300) | 0.75–0.82 | 0.488 | 0.009 |
| 36 | Urethane | PVdC (8300) | 0.75–0.82 | 0.340 | 0.011 |
| 37 | Urethane | PVdC (8300) | 0.75–0.82 | 0.392 | 0.009 |
| 38 | Urethane | PVdC (8500) | 0.75–0.82 | 0.326 | 0.007 |
| 39 | Urethane | PVdC (8500) | 0.75–0.82 | 0.265 | 0.011 |
| 40 | Urethane | PVdC (8300) | 0.75–0.82 | 0.234 | 0.007 |
| 41 | Urethane | PVdC (8500) | 0.75–0.82 | 0.348 | 0.008 |
| 42 | Urethane | PVdC (8300) | 0.75–0.82 | 0.479 | 0.008 |

Film Samples 8–42 are coated metallized polypropylene films according to the present invention. The water vapor transmission rates of Samples 8–42 are given in g/100 in$^2$/day and were measured at 100° F. and 90% Rh (ASTM F 1249-89). The oxygen transmission rates of Film Samples 8–42 are given in cc/100 in$^2$/day and were measured at 73° F. and 0% Rh (ASTM D 3985-81).

Film Samples 8–42 showed improved barrier properties in comparison to uncoated Film Samples 1–7. In particular, the coated Film Samples 8–42 showed improved resistance to water vapor transmission and oxygen transmission in comparison to uncoated Film Samples 1–7. For example, the average oxygen transmission rate for Film Samples 1–7 was 1.53 cc/100 in$^2$/day whereas the average oxygen transmission rate for the Film Samples from TABLE 2 which include 8500 PVdC as a coating was 0.214 cc/100 in$^2$/day and the oxygen transmission rate for the Film Samples from TABLE 2 which include 8300 PVdC as a coating was 0.613 cc/100 in$^2$/day. Further, the average water vapor transmission rate for uncoated Film Samples 5–7 was 0.171 g/100 in$^2$/day whereas the Film Samples from TABLE 2 which include 8500 PVdC as a coating had an average water vapor transmission rate of 0.008 g/100 in$^2$/day and the Film Samples from TABLE 2 which include 8300 PVdC as a coating had an average water vapor transmission rate of 0.040 g/100 in$^2$/day.

Film Samples 8–42 included either 8300 PVdC or 8500 PVdC as a coating. Two different PVdC coatings were used to show that a multilayer metallized polypropylene film structure of the present invention can be even further improved by using a higher crystalline material coating. In particular, 8500 PVdC is a higher crystalline material and as shown, it provides better barrier than a 8300 PVdC.

Figure 1:
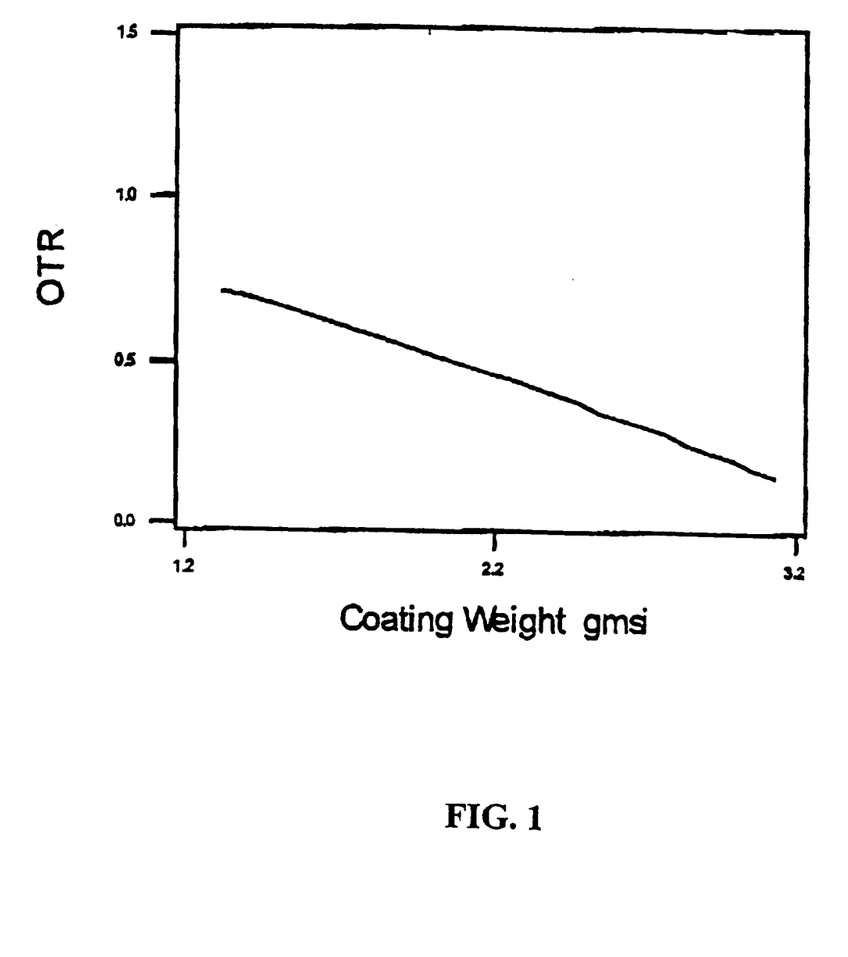
FIG. 1 is a plot showing the correlation between the oxygen transmission rate and the coating weight of multilayer metallized polyolefin films according to the present invention.
Figure 2:
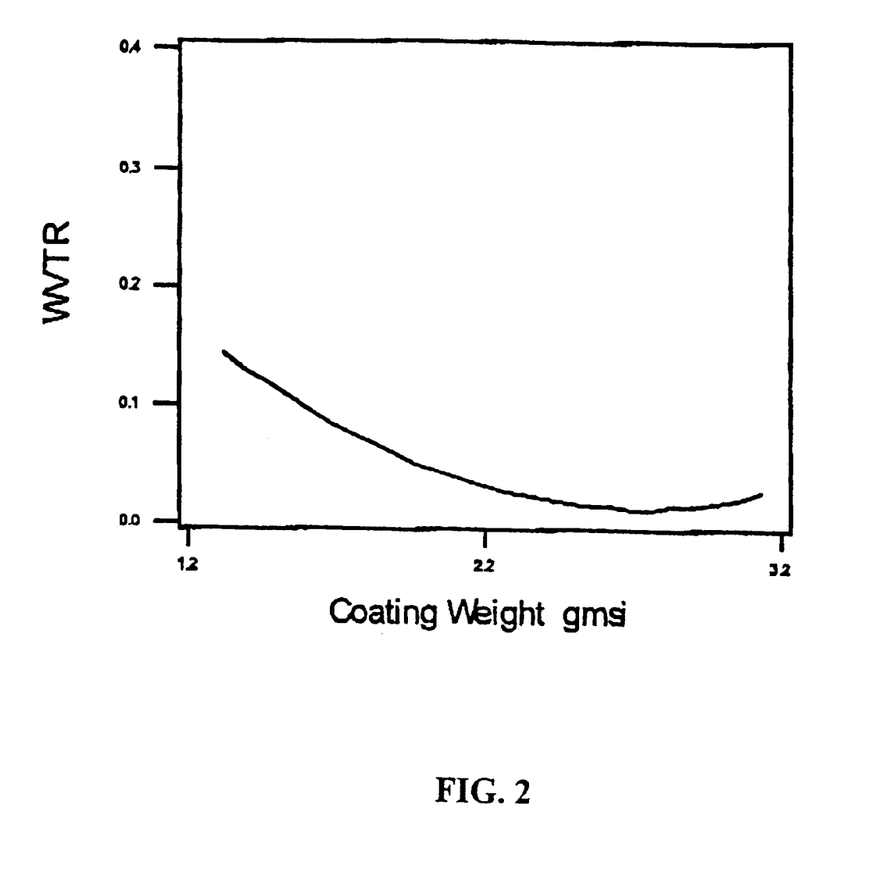
FIG. 2 is a plot showing the correlation between the water vapor transmission rate and the coating weight of multilayer metallized polyolefin films according to the present invention.

The effect of the weight of the PVdC coating as it relates to the oxygen transmission and water vapor transmission rates of Film Samples 8–42 is shown in FIGS. 1 and 2. The oxygen transmission rate in FIG. 1 was measured in cc/100 in$^2$/day and the coating weight was measured in grams per square inch (gmsi). The water vapor transmission rate in FIG. 2 was measured in g/100 in$^2$/day and the coating weight was measured in gmsi. It is readily apparent from FIGS. 1 and 2 that oxygen transmission and water vapor transmission barrier improve as the weight of the PVdC coating in a film structure increases.

Film Samples such as Film Samples 13, 14, 24 and 25 had a higher than expected oxygen transmission rate and Film Samples 20 and 21 had a higher than expected water vapor transmission rate, but it is believed that these high values are attributed to metal damage on the coating line, such as scratching on the metal surface.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

What is claimed is:

1. A multilayer film structure having improved barrier properties and reduced water vapor transmission and oxygen transmission properties, comprising:
   (a) a substrate comprising polypropylene homopolymer having a first and second side;
   (b) a first skin layer adjacent said first side of said substrate, wherein said skin layer comprises ethylene propylene random copolymer (EP), ethyl vinyl alcohol copolymer (EVOH), high density polyethylene (HDPE), medium density polyethylene (MDPE), linear low density polyethylene (LLDPE), low density polyethylene (LDPE), ethylene propylene butylene terpolymer (EPB), or propylene butylene copolymer (PB);
   (c) a metallized layer adjacent said first skin layer, wherein said metallized layer is formed by metallization of said first skin layer;
   (d) a primer applied to said metallized layer on the surface opposing said first skin layer; and
   (e) a first coating layer comprising polyvinylidene chloride (PVdC) adjacent said primed metallized layer;
   wherein said substrate and said first skin layer are coextruded and biaxially oriented.

2. A multilayer film structure according to claim 1, wherein said PVdC has a vinylidene chloride content of from about 75 wt % to about 99 wt %.

3. A multilayer film structure according to claim 1, wherein said first coating layer comprises from about 3.0 wt % to about 22.0 wt % of said film structure.

4. A multilayer film structure according to claim 1, wherein said metallized layer is less than 0.1 wt % of said film structure.

5. A multilayer film structure according to claim 1, wherein said primer layer comprises a primer selected from the group consisting of polyethylene imine, urethane and epoxy.

6. A multilayer film structure according to claim 1, wherein said substrate comprises a maleic acid anhydride modified propylene homopolymer or copolymer.

7. A multilayer film structure according to claim 1, further composing a second skin layer adjacent said second side of said substrate, said second skin layer comprising a polyolefin selected from the group consisting of ethylene propylene copolymer, ethylene propylene butylene terpolymer, propylene butylene copolymer, ethylene propylene impact copolymer, ethylene methyl acrylate, ethylene vinyl acetate copolymer, HDPE, MDPE, LDPE and LLDPE.

8. A multilayer film structure according to claim 7, wherein said second skin layer is coated with a coating selected from the group consisting of PVdC, acrylic coating, and ethylene acrylic acid copolymer.

9. A multilayer film structure comprising:
   (a) a substrate comprising polypropylene homopolymer having a first side and a second side;
   (b) a first skin layer consisting essentially of high density polyethylene (HDPE) adjacent said first side of said substrate;
   (c) a vacuum deposited aluminum layer adjacent said first skin layer;
   (d) a primer comprising urethane applied to said aluminum layer; and
   (e) a first coating layer comprising polyvinylidene chloride (PVdC) adjacent said primed aluminum layer;
   wherein said substrate and said first skin layer are coextruded and biaxially oriented.

10. A multilayer film structure according to claim 9, further comprising a second skin layer adjacent said second side of said substrate, wherein said second skin layer consists essentially of an ethylene propylene random copolymer, an ethylene propylene butylene terpolymer, a propylene butylene copolymer or an ethylene propylene impact copolymer.

11. A multilayer film structure comprising:
   (a) a substrate comprising maleic acid anhydride modified polypropylene homopolymer or copolymer having a first side and a second side;
   (b) a first skin layer consisting essentially of ethyl vinyl alcohol copolymer (EVOH) adjacent said first side of said substrate;
   (c) a vacuum deposited aluminum layer adjacent said first skin layer;
   (d) a primer comprising urethane applied to said aluminum layer; and
   (e) a first coating layer comprising polyvinylidene chloride (PVdC) adjacent said primed aluminum layer;
   wherein said substrate and said first skin layer are coextruded and biaxially oriented.

12. A multilayer film structure according to claim 11 further comprising a second skin layer adjacent said second side of said substrate, wherein said second skin layer consists essentially of an ethylene propylene random copolymer, an ethylene propylene butylene terpolymer, a propylene butylene copolymer or an ethylene propylene impact copolymer.

* * * * *